No. 676,388. Patented June 11, 1901.
J. MELLEIN.
CONCENTRATOR.
(Application filed Mar. 26, 1900.)
(No Model.)

Witnesses,
H. M. Neff
Grace Mytinger

Inventor,
Jacob Mellein,
By
Attorney.

UNITED STATES PATENT OFFICE.

JACOB MELLEIN, OF DENVER, COLORADO.

CONCENTRATOR.

SPECIFICATION forming part of Letters Patent No. 676,388, dated June 11, 1901.

Application filed March 26, 1900. Serial No. 10,205. (No model.)

*To all whom it may concern:*

Be it known that I, JACOB MELLEIN, a citizen of the United States of America, residing at Denver, in the county of Arapahoe and State of Colorado, have invented certain new and useful Improvements in Concentrators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in concentrators more especially intended for use in placer mining, my object being to provide an apparatus of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

Figure 1:
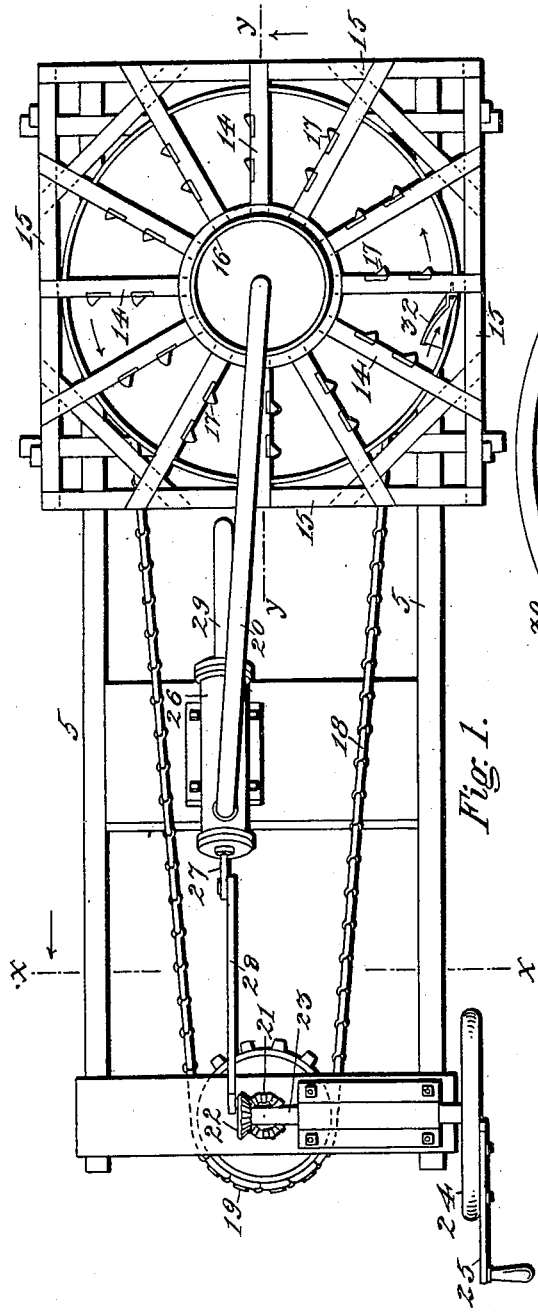
Figure 3:
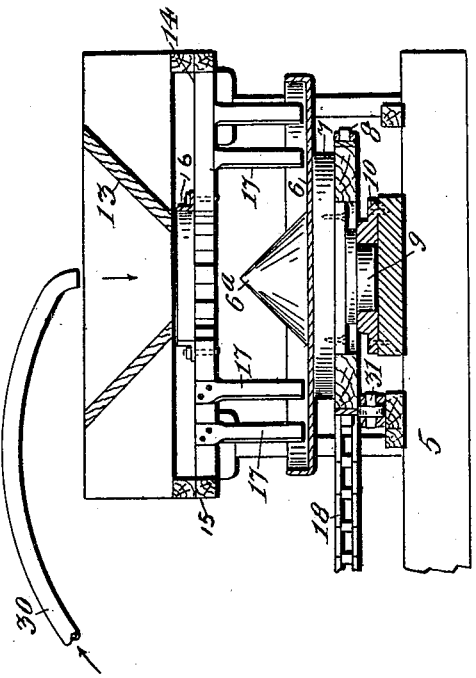
Figure 2:
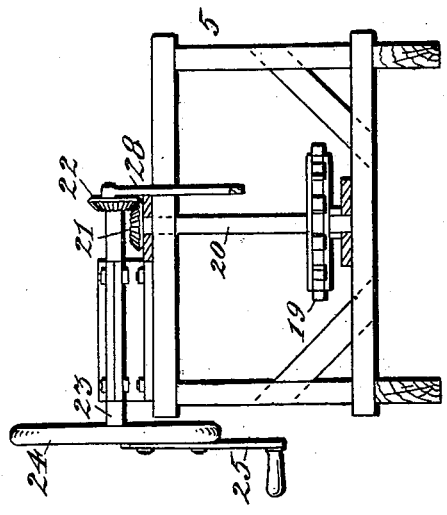

In the drawings, Figure 1 is a top or plan view of my improved machine. Fig. 2 is a section taken on the line X X, Fig. 1, viewed in the direction of the arrow. Fig. 3 is a section taken on the line Y Y, Fig. 1.

Similar reference characters indicating corresponding parts in the views, let the numeral 5 designate a suitable frame, at one extremity of which is located a horizontal revoluble pan 6, whose bottom is provided with a drum 7, to which is attached a large sprocket-wheel 8. The bottom of the drum is provided with a journal 9, engaging a bearing 10, mounted on the lower part of the frame. The pan 6 is provided with a conical center 6ᵃ, located directly beneath a hopper 15, mounted on the upper part of the frame. Between the hopper and the pan is located a series of radial bars 14, whose outer extremities are attached to a rectangular top frame 15, mounted on the main frame 5. To the inner extremities of the bars 14 is attached a ring 16, surrounding the opening through which the material to be treated passes from the hopper to the pan. To the bars 14 are attached depending agitating-arms 17, which project into the pan 6, terminating near its bottom.

The pan is rotated through the instrumentality of a chain 18, which passes around the sprocket 8 of the drum and a smaller sprocket 19, mounted on the lower part of a vertical shaft 20, journaled in one end of the frame 5. To the upper extremity of this shaft is made fast a bevel-gear 21, which meshes with a similar gear 22, fast on a horizontal shaft 23, provided with a fly-wheel 24, to which is attached a crank 25.

The pan is supplied with the necessary water for separating the mineral from the gangue through the instrumentality of a pump 26, whose piston-rod 27 is connected with one extremity of a pitman 28, whose opposite extremity is connected with a wrist attached to the gear 22 outside of its center. The pump-cylinder 26 is connected with a pipe 29, leading from a source of water-supply. A discharge-pipe 30 is connected with the upper part of the pump-cylinder and leads therefrom to a point above the center of the hopper, into which it discharges.

From the foregoing description it will be understood that if the shaft 23 be turned the pan will be rotated through the instrumentality of the shaft 20, the sprocket-wheels 8 and 19, and the chain 18, the pump being at the same time operated by virtue of the construction just described. The material to be treated is thrown into the hopper and passes to the rotary pan, together with the necessary quantity of water. The cone 6ᵃ, acting in conjunction with the water, distributes the material as it passes into the pan, and the separation of the mineral from the gangue is effected by the combined action of the rotary pan and the agitating-arms 17. The pan is kept full of water, which overflows therefrom, carrying away the gangue, while the mineral settles to the bottom of the pan.

Attached to one of the arms 14 is a sort of shovel or plow 32, which projects into the pan near its outer edge and facilitates the discharge of the gangue. The drum upon which the pan is mounted is supported on the side nearer the small sprocket 9 by a roller 23.

Having thus described my invention, what I claim is—

In a concentrator the combination with a suitable frame, of a horizontally, revoluble pan whose bottom is provided with a drum having a sprocket-wheel, the said drum terminating at its bottom in a journal engaging the bearing of the frame, the pan being provided with a conical center, a hopper mounted above the pan, a top frame mounted on the main frame, a series of radially-disposed bars located between the pan and the hopper, their outer extremities being attached to the frame, a ring attached to their inner extremities, depending agitating-arms attached to the bars and projecting into the pan, an operating-chain connected with the sprocket on the drum of the pan, means for actuating the chain, a pump operated by the chain-operating means, a conduit leading from the pump to discharge water into the pan, and a shovel or plow attached to one of the depending agitating-arms, and projecting into the pan near its outer edge to throw out the gangue as the pan rotates.

In testimony whereof I affix my signature in presence of two witnesses.

JACOB MELLEIN.

Witnesses:
GRACE MYTINGER,
H. J. O'BRIEN.